US008122001B2

(12) United States Patent
Morimoto (10) Patent No.: US 8,122,001 B2
(45) Date of Patent: Feb. 21, 2012

(54) METHOD OF RETRIEVING AN APPROPRIATE SEARCH ENGINE

(75) Inventor: Yasutsugu Morimoto, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 1016 days.

(21) Appl. No.: 11/770,150

(22) Filed: Jun. 28, 2007

(65) Prior Publication Data

US 2008/0016147 A1 Jan. 17, 2008

(30) Foreign Application Priority Data

Jun. 29, 2006 (JP) .................... 2006-179519

(51) Int. Cl.
*G06F 7/00* (2006.01)
*G06F 17/30* (2006.01)

(52) U.S. Cl. ....................................... 707/707
(58) Field of Classification Search .................. 707/707, 707/999.003
See application file for complete search history.

(56) References Cited

U.S. PATENT DOCUMENTS

| 7,016,892 | B1* | 3/2006 | Kokkonen et al. | .................... 1/1 |
| 7,617,203 | B2* | 11/2009 | Awadallah et al. | .................... 1/1 |
| 2003/0014399 | A1* | 1/2003 | Hansen et al. | .................... 707/3 |
| 2003/0172075 | A1* | 9/2003 | Reisman | ................. 707/10 |
| 2006/0064411 | A1* | 3/2006 | Gross et al. | .................... 707/3 |
| 2006/0173830 | A1* | 8/2006 | Smyth et al. | .................... 707/3 |
| 2007/0150465 | A1* | 6/2007 | Brave et al. | .................... 707/5 |

FOREIGN PATENT DOCUMENTS

| JP | 2002-278980 | 9/2002 |
| JP | 2005-242760 | 9/2005 |

OTHER PUBLICATIONS

"Information Retrieval Algorithm" by Kenji Kita, et al., Kyoritsu Shuppan Co., Ltd., 2002.

* cited by examiner

*Primary Examiner* — Kimberly Lovel
(74) *Attorney, Agent, or Firm* — Mattingly & Malur, PC (57) ABSTRACT

To allow a user to use an appropriate search engine, this invention provides a computer system including: a client computer; a search engine; and a management computer, in which the management computer is configured to: collect logs of access; specify a parameter transferred from the client computer to an access destination of the client computer by analyzing the collected logs of access; judge that an access including a parameter judged as a search query is an access to the search engine; select a log of access to the search engine from the collected logs of access; extract an address of the search engine and the search query from the selected log of access to the search engine; and store a correspondence between the extracted address of the search engine and the extracted search query in a search engine profile.

15 Claims, 8 Drawing Sheets

| URL<br>1161 | TITLE<br>1162 | TERMHOOD<br>1163 | ACCESS FREQUENCY<br>1164 |
|---|---|---|---|
| http://search.aaa.··· | BIO INFORMATION SEARCH | 0.8 | 300 |
| ... | ... | ... | ... |
| http://search.bbb.··· | INTEGRATED DEVELOPMENT ENVIRONMENT | 0.2 | 100 |
| ... | ... | ... | ... |

116

SEARCH ENGINE ATTRIBUTE FILE

```
<form method="GET" action="cgi-bin/xxx.cgi">
KEYWORD <input type="text" name="KEYWORD">
<input type="submit" value="SEARCH ">
</form>
```

| | KEYWORD | DEVELOPMENT ENVIRONMENT OBJECT-ORIENTED | SEARCH | | |
|---|---|---|---|---|---|

SEARCH RESULT

| URL | TITLE | REPRESENTATIVE KEYWORD | TERM-HOOD | ACCESS FREQUENCY |
|---|---|---|---|---|
| http://search.bbb.··· | BIO INFORMATION SEARCH | DEVELOPMENT ENVIRONMENT | 0.8 | 300 |
| ··· | ··· | ··· | ··· | ··· |
| http://search.abc.··· | INTEGRATED DEVELOPMENT ENVIRONMENT | JAVA SCRIPT | 0.2 | 100 |
| ··· | ··· | ··· | ··· | ··· |

*FIG. 11*

METHOD OF RETRIEVING AN APPROPRIATE SEARCH ENGINE

CLAIM OF PRIORITY

The present application claims priority from Japanese patent application P2006-179519 filed on Jun. 29, 2006, the content of which is hereby incorporated by reference into this application.

BACKGROUND OF THE INVENTION

This invention relates to a meta-search technique with which a search engine is discriminately used according to a request of a user, and more particularly, to a technique of retrieving a search engine that meets a request of a user.

As a result of prevalence of personal computers and the Internet, an amount of electronic documents that can be accessed by a user is increasing. As a countermeasure for such situation, there is known a document search technique. The document search technique is a technique of retrieving a document that matches a search query input by the user. It should be noted that the search query may be a keyword or a sentence.

A large number of search engines have been constructed on intranets of companies and the like, and on the Internet. The user uses those search engines to acquire an appropriate document. It should be noted that the search engines are classified into a general-purpose search engine, that is the horizontal search engine, and a dedicated-purpose search engine, that is the vertical search engine.

The general-purpose search engine searches large variety of document stored in the search engine. An example of the general-purpose search engine is Google™.

The vertical search engine retrieves the document requested by the user from among the specific types of documents. Examples of the vertical search engine include a patent search engine, a search engine for in-company reports, and a manual search engine.

The user needs to discriminately use an appropriate search engine to acquire an appropriate document. However, it is extremely complicated for the user to discriminately use the search engine according to a purpose of the search.

JP 2002-278980 A discloses a meta-search technique that solves the problem described above. The meta-search technique is a technique of integrally performing search processing with respect to a plurality of search engines. The specific processing is as follows. First, a search query is input to a meta-search engine. Then, the meta-search engine transmits a search request to the plurality of search engines in parallel. After that, the meta-search engine collectively outputs search results received from the respective search engines. As described above, the meta-search technique improves convenience of the user.

On the other hand, a quality of the search result is important for improving the convenience of the user. JP 2005-242760 A discloses a technique for improving a search quality. In the technique disclosed in JP 2005-242760 A, a search know-how of other users is used. Specifically, judgment is made on a value of a document corresponding to a search result, based on an operation of the user with respect to the search result.

Alternatively, "Information Retrieval Algorithm" by Kenji Kita, Kazuhiko Tsuda, and Masami Shishibori, KYORITSU SHUPPAN CO., LTD discloses various techniques for retrieving a document, such as a search using a Boolean expression, which includes an OR search, and a similarity search using a vector model.

SUMMARY OF THE INVENTION

The conventional meta-search techniques are provided under a presupposition that the search engines are known. Thus, a list of the known search engines needs to be managed. However, it is extremely difficult to manage the list of search engines. Therefore, the meta-search techniques require a high cost.

Further, the meta-search engine needs to transmit a search query in a format conforming to the respective search engines. Thus, the format that conforms to the respective search engines needs to be managed as additional information in the list of search engines. Accordingly, the cost required for managing the list of search engines further increases.

This invention has been made in view of the above-mentioned problems, and it is therefore an object of this invention to provide a technique for supporting a user in discriminately using a search engine.

According to an exemplary embodiment of this invention, there is provided a computer system, comprising: at least one client computer including a processor, a memory, and an interface; at least one search engine; and a management computer, and the client computer, search engine, and the management computer are connected via a network; wherein the management computer is configured to: collect logs of access from the client computer; specify a parameter transferred from the client computer to an access destination of the client computer by analyzing the collected logs of access; judge whether the specified parameter is a search query; judge that an access including the parameter judged as the search query is an access to the search engine; select a log of access to the search engine from the collected logs of access; extract an address of the search engine and the search query from the selected log of access to the search engine; and store a correspondence between the extracted address of the search engine and the extracted search query in a search engine profile.

According to a representative embodiment of this invention, the user can use an appropriate search engine depending on its purpose.

BRIEF DESCRIPTION OF THE DRAWINGS

The present invention can be appreciated by the description which follows in conjunction with the following figures, wherein.

DETAILED DESCRIPTION OF THE PREFERRED EMBODIMENTS

Hereinafter, an embodiment of this invention will be described with reference to the drawings.

Figure 1:
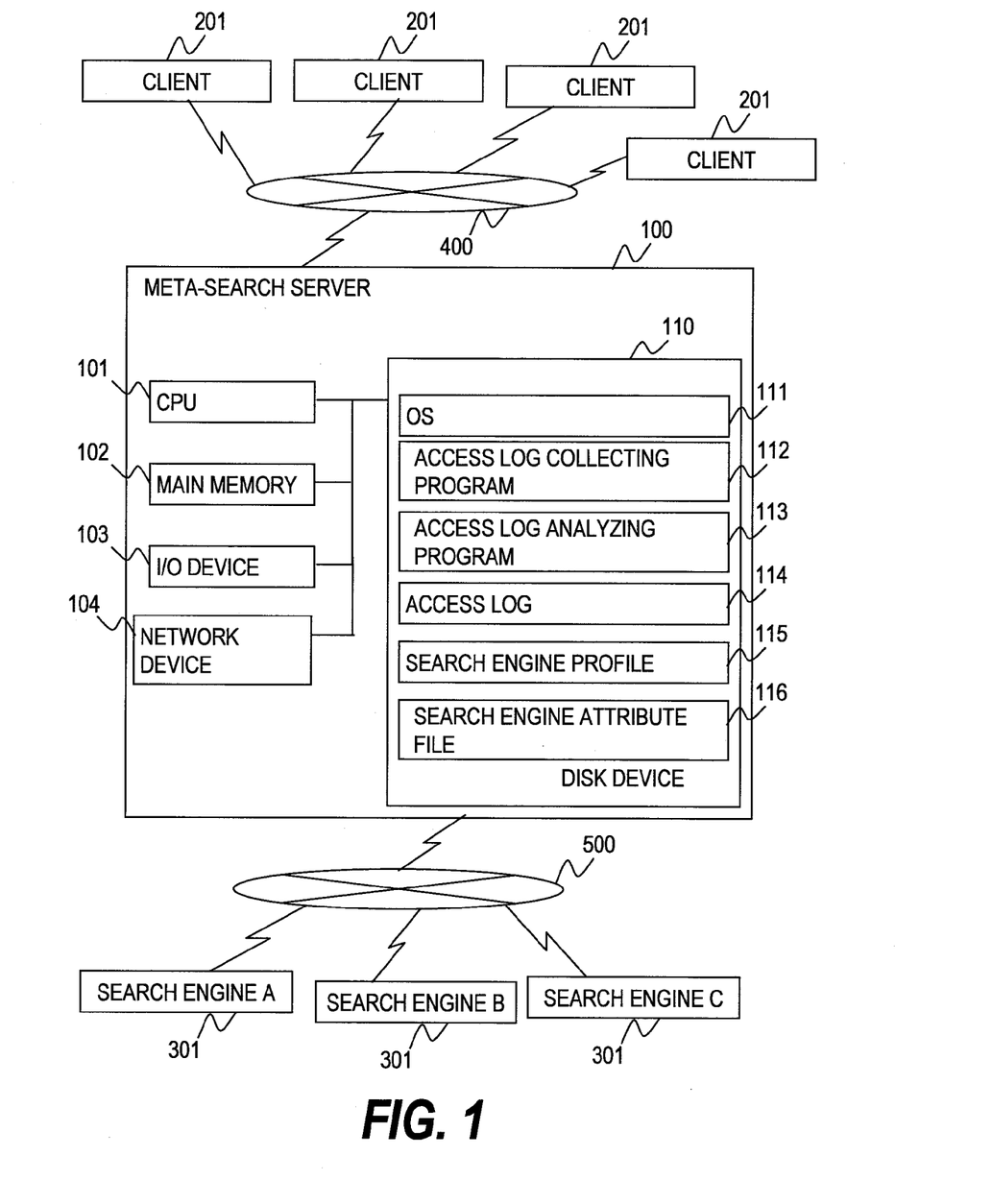
FIG. 1 is a block diagram of a configuration of a computer system according to a embodiment of this invention.

FIG. 1 is a block diagram of a configuration of a computer system according to the embodiment of this invention.

The computer system includes one or more client computers 201, a meta-search server 100, a plurality of search engines 301, a network 400, and a network 500.

The network 400 connects the client computers 201 with the meta-search server 100. The network 400 is, for example, a local area network (LAN).

Further, the network 500 connects the meta-search server 100 with the search engines 301. The network 500 is, for example, the Internet. It should be noted that the networks 400 and 500 may constitute a single network.

Each of the client computers 201 includes a CPU, a main memory, and an interface. The CPU provided in the client computer 201 executes a program stored in the main memory to perform various types of processing. The main memory provided in the client computer 201 stores the program executed by the CPU, information required by the CPU, and the like. The interface provided in the client computer 201 is connected to the meta-search server 100 via the network 400.

The client computer 201 transmits a search query to the search engines 301. After that, the client computer 201 receives search results from the search engines 301.

Each of the search engines 301 includes a CPU, a main memory, and an interface. The CPU provided in the search engine 301 executes a program stored in the main memory to perform various types of processing. The main memory provided in the search engine 301 stores the program executed by the CPU, information required by the CPU, and the like. For example, the main memory provided in the search engine 301 stores a common gateway interface (CGI) program. The interface provided in the search engine 301 is connected to the meta-search server 100 via the network 500.

The search engine 301 receives a search query from the client computer 201. Next, the search engine 301 searches for a site that matches the received search query. Then, the search engine 301 transmits to the client computer 201 information on the searched site as the search result. In other words, the search engine 301 serves as a database for searching for a site required by the client computer 201.

The meta-search server 100 includes a CPU 101, a main memory 102, an I/O device 103, a network device 104, and a disk device 110. Further, the meta-search server 100 is equipped with a function similar to that of a general proxy server. The proxy server is a computer that permits web access of the client computer 201 based on user authentication.

The CPU 101 executes a program stored in the main memory 102 to perform various types of processing. Specifically, the CPU 101 loads and executes a program stored in the disk device 110 in the main memory 102.

The main memory 102 stores the program executed by the CPU 101, information required by the CPU 101, and the like. A user inputs information to the I/O device 103. In addition, the I/O device 103 outputs information in response to an instruction of the CPU 101. For example, the I/O device 103 includes at least one of a keyboard, a mouse, and a display.

The network device 104 is connected to the client computer 201 via the network 400. Further, the network device 104 is connected to the search engine 301 via the network 500.

The disk device 110 stores various types of information. Specifically, the disk device 110 stores an OS 111, an access log collecting program 112, an access log analyzing program 113, an access log 114, a search engine profile 115, and a search engine attribute file 116.

The OS 111 controls overall processing performed by the meta-search server 100.

The access log collecting program 112 collects logs of access to a search engine or other web page via network 500 from the client computer 201. The access log collecting program 112 manages the collected logs as the access log 114. It should be noted that the access log collecting program 112 may use an log file of the proxy server as the access logs of the client computer 201.

The access log analyzing program 113 analyzes the access log 114. Accordingly, the access log analyzing program 113 updates the search engine profile 115 and the search engine attribute file 116.

The access log 114 includes logs of access from the client computer 201, which have been collected by the access log collecting program 112. It should be noted that the access log 114 will be described later in detail with reference to FIG. 2.

The search engine profile 115 manages a correspondence between the search engine 301 and a term transmitted as the search query to the search engine 301. It should be noted that the search engine profile 115 will be described later in detail with reference to FIG. 3.

The search engine attribute file 116 manages attribute information of the search engine 301. It should be noted that the search engine attribute file 116 will be described later in detail with reference to FIG. 5.

The meta-search server 100 may be realized by a plurality of servers. For example, the meta-search server 100 may be realized by a server that executes the access log collecting program 112 and a server that executes the access log analyzing program 113.

Figure 2:
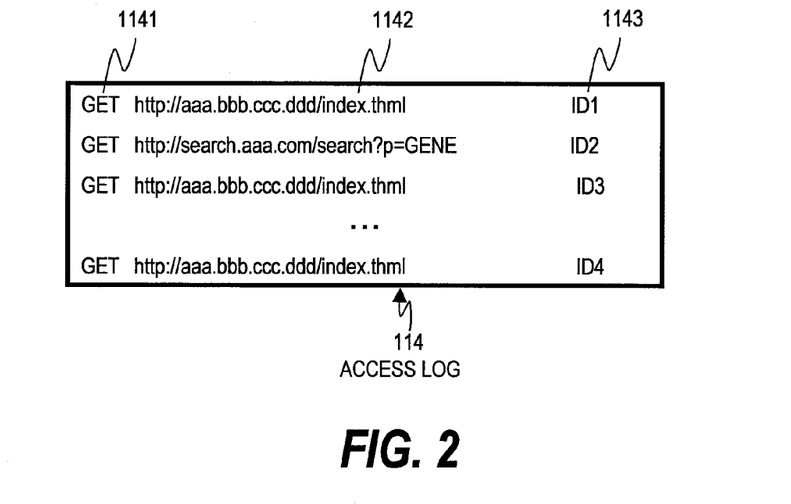
FIG. 2 is an explanatory diagram of a access log stored in a meta-search server according to the embodiment of this invention.

FIG. 2 is an explanatory diagram of the access log 114 stored in the meta-search server 100 according to the embodiment of this invention.

The access log 114 includes a command type 1141, an access destination uniform resource locator (URL) 1142, and a user ID 1143.

The command type 1141 is a type of a command transmitted from the client computer 201. It should be noted that in this embodiment, the client computer 201 transmits a command according to a hypertext transfer protocol (HTTP). However, the client computer 201 may transmit a command according to other protocols.

The access destination URL 1142 is an address of a site accessed according to the command.

Information is registered as "http://<host>:<port>/<path>?<searchpart>" in the access destination URL 1142. The "host" indicates a domain name of a network host or an IP address thereof. The "port" indicates a port number used for connection. It should be noted that when the "port" is omitted, a default value "80" is used as the "port". The "path" indicates a path for specifying a location of a resource to be accessed. The "searchpart" indicates a query character string which is passed to an http server as an argument. The search query with respect to the search engine is embedded in the "searchpart".

The user ID 1143 is an identifier unique to the client computer 201 as a transmission source of the command.

Figure 3:
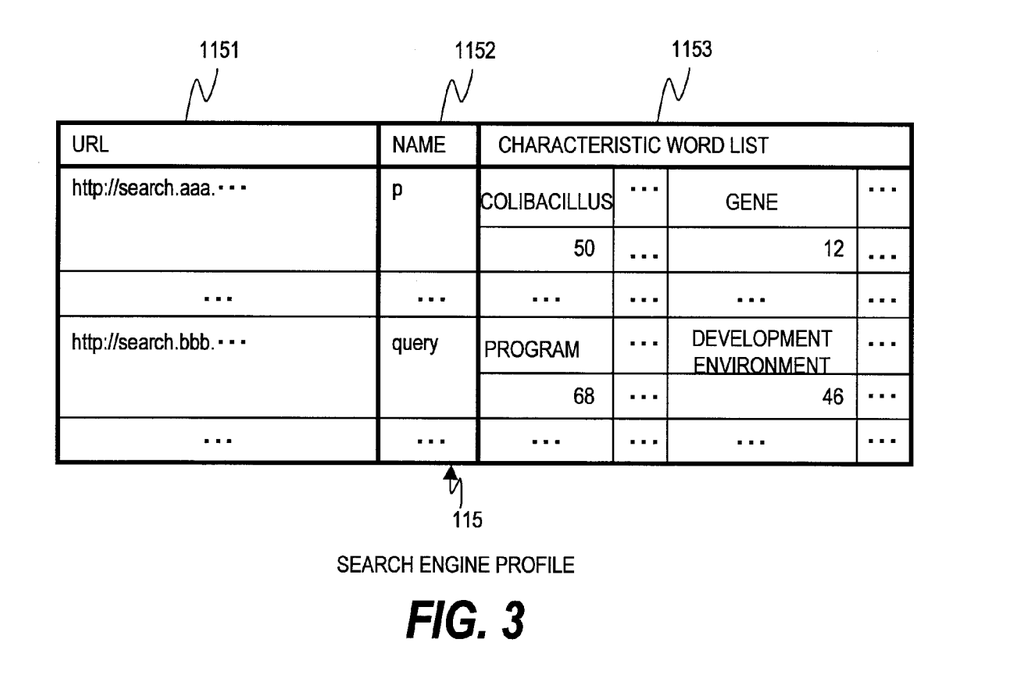
FIG. 3 is a configuration diagram of a search engine profile stored in the meta-search server according to the embodiment of this invention.

FIG. 3 is a configuration diagram of the search engine profile 115 stored in the meta-search server 100 according to the embodiment of this invention.

The search engine profile 115 includes a URL 1151, a name 1152, and a characteristic word list 1153.

The URL 1151 is an address of a site judged as being the search engine 301 by the meta-search server 100. It should be noted that the meta-search server 100 automatically judges, based on access from the client computer 201, whether a site of the access destination is the search engine 301.

The name 1152 is information used by the search engine 301 corresponding to the URL 1151 of the record, for specifying a search query from the search command. Transmission of the search command is a type of access from the client computer 201 to the search engine 301, and the search command contains a URL of a CGI specification to be described later with reference to FIG. 4.

The characteristic word list 1153 includes a characteristic word and the number of search times. The characteristic word is a term transmitted as the search query to the search engine 301 corresponding to the URL 1151 of the record. The number of search times is the number of times the characteristic word has been transmitted to the search engine 301 corresponding to the URL 1151 of the record.

Figure 4:
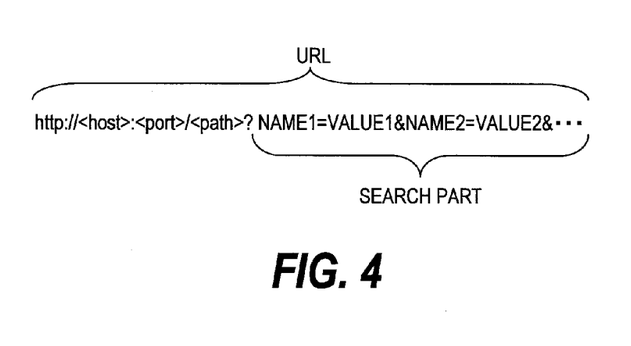
FIG. 4 is an explanatory diagram of syntax of a URL in the CGI specification according to the embodiment of this invention.

FIG. 4 is an explanatory diagram of the URL of the CGI specification according to the embodiment of this invention.

The CGI is a specification on how general programs can be run on the web server in response to a web request (including setting of an environment variable (meta-variable) name and value).

Information in a format unique to the CGI is included in the URL as the "searchpart". Specifically, one or more pairs of a name and value are included in the URL as the "searchpart". In the case where a plurality of pairs of the name and value are included, the pairs are coupled to each other by a symbol "&". Further, in each of the pairs, the name and the value are coupled to each other by a symbol "=". In other words, a pair of an i-th name and a value corresponding to the name is described as "name i=value i".

A CGI program of the search engine 301 acquires a character string corresponding to the "searchpart" according to an environment variable QUERY_STRING, for example. Next, the CGI program of the search engine 301 reads the acquired character string according to the CGI format. Accordingly, the CGI program of the search engine 301 extracts the pair of the name and value from the acquired character string.

With what kind of character string the name to be stored as the "searchpart" is to be described is not particularly specified in the CGI. In actuality, a name to be used in transmitting a search query input by the user to the CGI program is set in advance in the client computer 201 and the search engine 301. In other words, the set name indicates that the value in pair with the name is the search query.

The client computer 201 converts the search query input by the user into a value. Next, the client computer 201 stores the converted value and the name set in advance in a pair in the URL as the "searchpart". Then, the client computer 201 transmits the URL to the search engine 301.

The search engine 301 extracts a value in pair with the name set in advance from the received URL. Then, the search engine 301 determines that the extracted value is the search query.

As described above, a name for specifying the search query is set in advance in the client computer 201 and the search engine 301. Thus, the search engine 301 can read information in the CGI format.

It should be noted that a pair of a name and value that do not indicate the search query may be included as the "searchpart" in the URL transmitted to the search engine 301. At this time, which name indicates the search query depends on a design of an HTML document, for inputting the search query to the search engine 301.

Here, an effect of this embodiment will be described. The conventional meta-search server cannot grasp which name indicates the search query. Therefore, the conventional meta-search server cannot specify which part of the URL indicates the search query.

However, the meta-search server 100 of this embodiment can extract a search query from the URL transmitted to an arbitrary search engine 301. Details of this processing will be described later.

Figure 5:
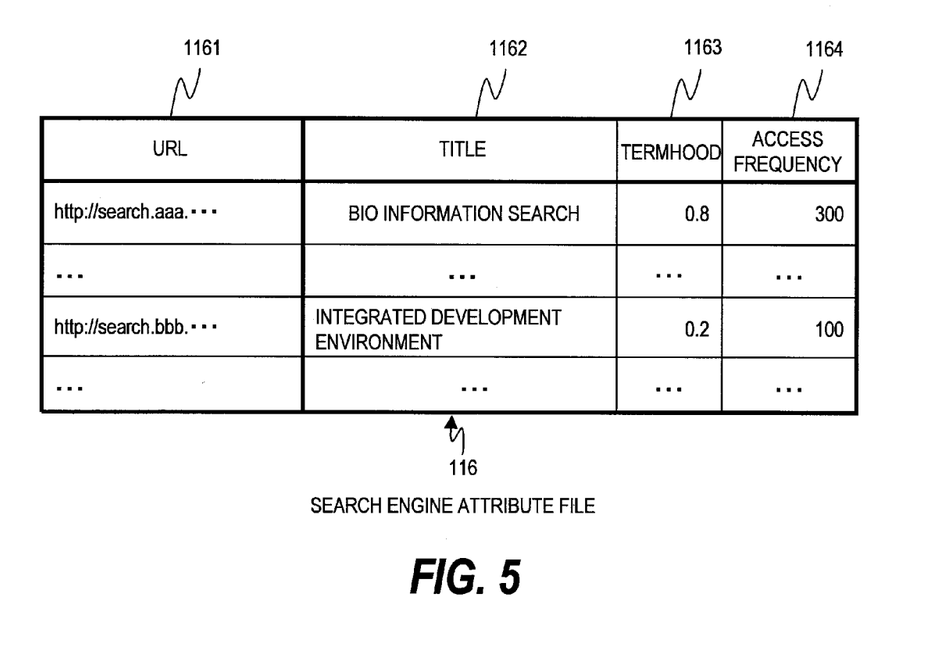
FIG. 5 is a configuration diagram of a search engine attribute file stored in the meta-search server according to the embodiment of this invention.

FIG. 5 is a configuration diagram of the search engine attribute file 116 stored in the meta-search server 100 according to the embodiment of this invention.

The search engine attribute file 116 includes a URL 1161, a title 1162, a termhood 1163, and an access frequency 1164.

The URL 1161 is an address of a site judged as being the search engine 301 by the meta-search server 100. The title 1162 is a character string in a TITLE tag contained in the HTML document which is acquired by accessing the URL 1161 of the record.

The termhood 1163 indicates a degree of technicality of the search engine 301 corresponding to the URL 1151 of the record. The termhood 1163 is a ratio of the number of kinds of terms to a total number of terms. The total number of terms is the number of terms that have been transmitted as the search query to the search engine 301. The number of kinds is the number of different terms among the terms transmitted as the search query to the search engine 301.

The closer the termhood 1163 is to "0", the higher the technicality of the search engine 301. This is because, since terms regarding a field of expertise conforming to the search engine 301 is input to the search engine 301 having high technicality, the possibility of the same term being input is high. On the other hand, the technicality of the search engine 301 becomes lower as the termhood 1163 becomes closer to "1", which means that the search engine is a general search engine 301. This is because, since terms regarding various fields are input to the general search engine 301, the possibility of the same term being input is low.

The access frequency 1164 is the number of times the search engine 301 corresponding to the URL 1161 of the record has been accessed.

Figure 6:
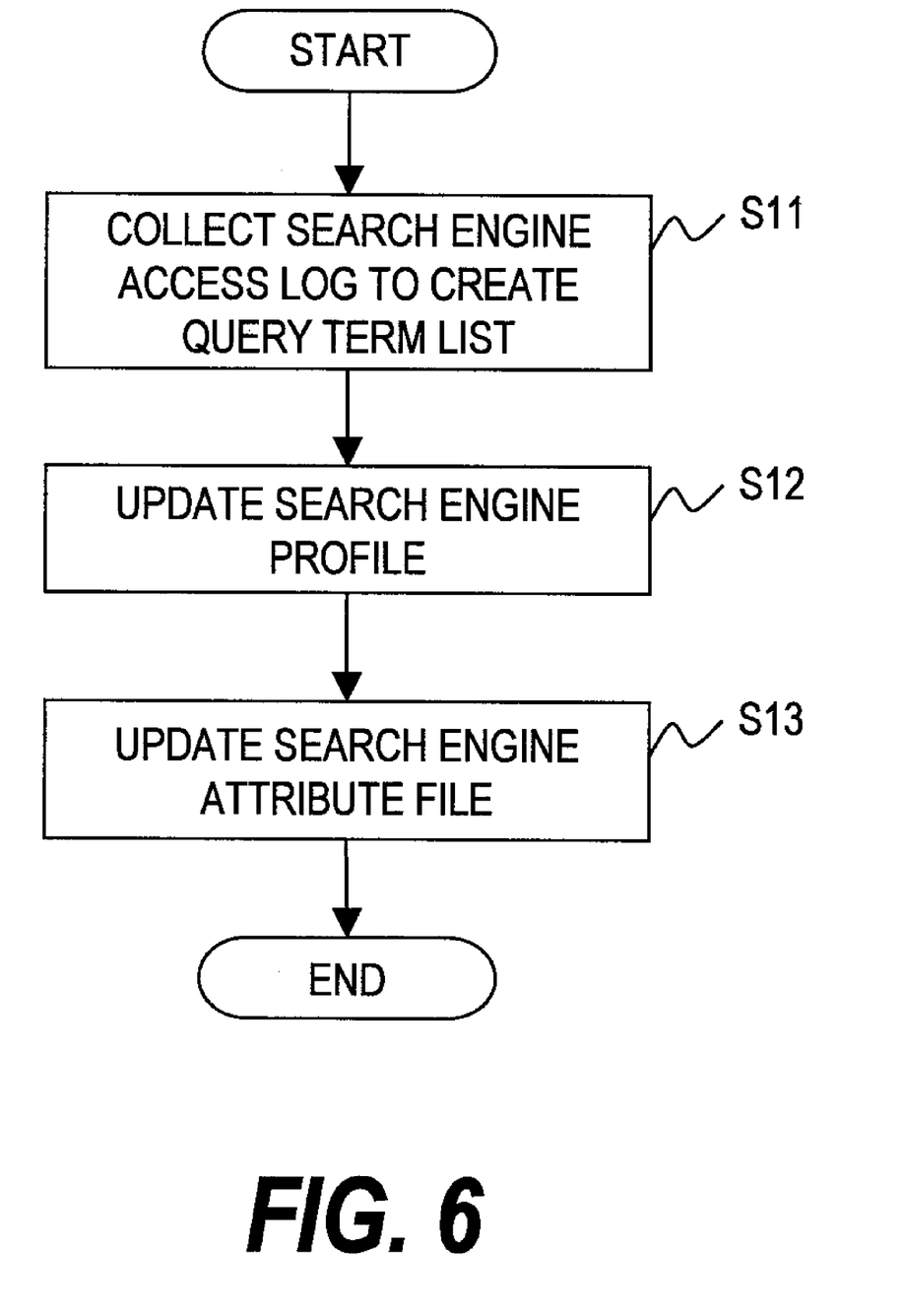
FIG. 6 is a flowchart of information update processing executed by the meta-search server according to the embodiment of this invention.

FIG. 6 is a flowchart of information update processing executed by the meta-search server 100 according to the embodiment of this invention.

The information update processing is executed periodically, for example.

First, the meta-search server 100 executes query term list creation processing (S11). It should be noted that the query term list creation processing will be described later in detail with reference to FIG. 8. By this processing, the meta-search server 100 creates a query term list for each search engine 301.

Subsequently, the meta-search server 100 updates the search engine profile 115 based on the created query term list (S12).

Specifically, the meta-search server 100 selects from the search engine profile 115 a record whose URL 1151 of the search engine profile 115 matches the URL of the search engine 301 corresponding to the created query term list. Next, the meta-search server 100 sequentially selects the terms contained in the query term list. Then, the meta-search server 100 selects from the selected record, a column whose characteristic word contained in the characteristic word list 1153 of the search engine profile 115 matches the selected term. Next, the meta-search server 100 increments the number of search times of the selected column.

It should be noted that the meta-search server 100 adds a new column to the characteristic word list 1153 of the selected record when being unable to select a column. Subsequently, the meta-search server 100 stores the selected term as the characteristic word of the added column. Further, the meta-search server 100 stores "1" as the number of search times of the added column.

Figure 7:
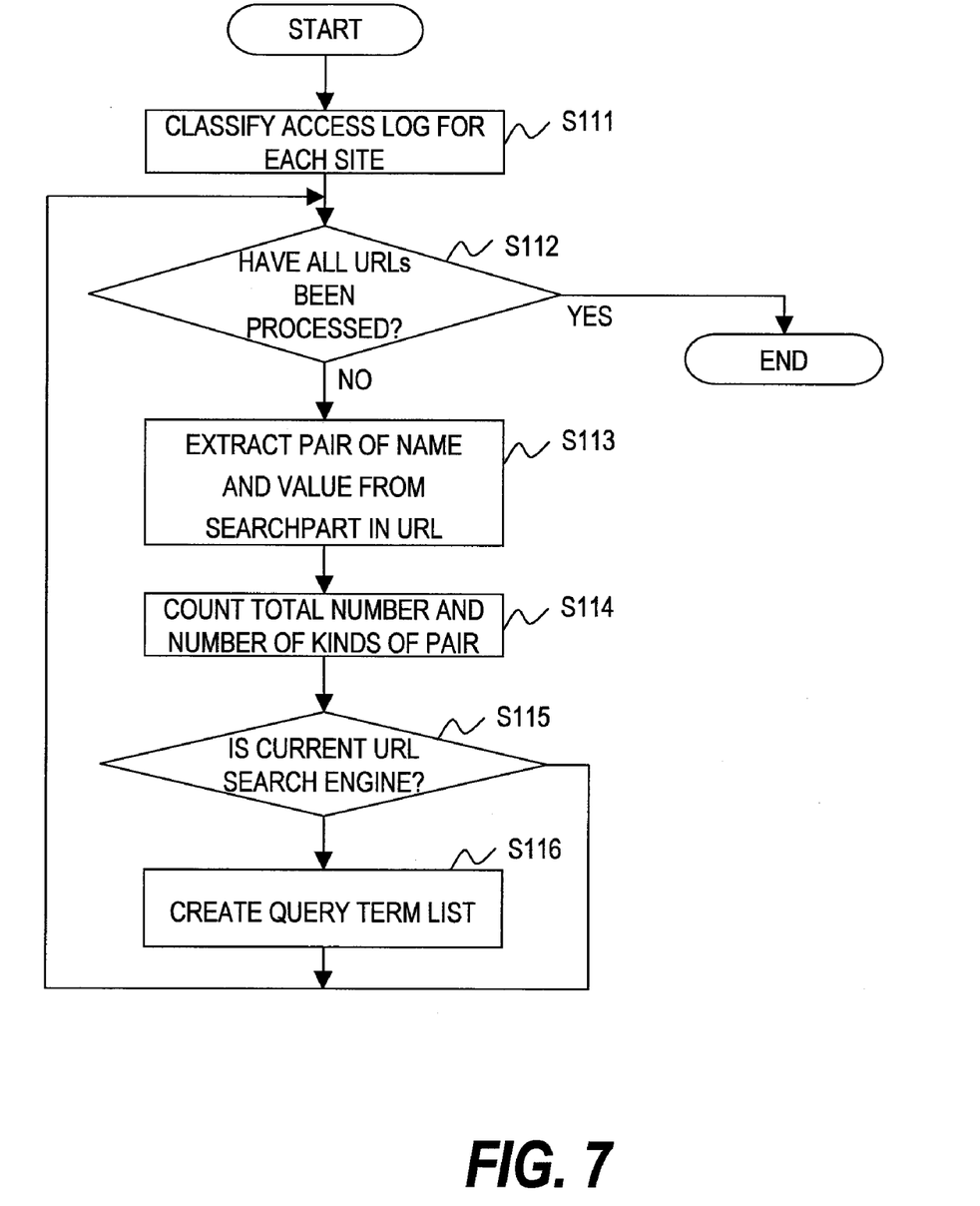
FIG. 7 is a flowchart of a query term list creation processing executed by the meta-search server according to the embodiment of this invention.

In addition, the meta-search server 100 adds a new record to the search engine profile 115 when being unable to select a record that matches the URL. Next, the meta-search server 100 stores a URL of the search engine 301 corresponding to the created query term list as the URL 1151 of the newly added column. Then, the meta-search server 100 stores a name specified as being indicative of a search query in the query term list creation processing in Step S11, the processing of which is shown in FIG. 7, as the name 1152 of the new record. After that, the meta-search server 100 stores all the terms contained in the query term list as the characteristic word list 1153 of the new record.

As described above, the meta-search server 100 updates the search engine profile 115.

Next, the meta-search server 100 updates the search engine attribute file 116 (S13).

Specifically, the meta-search server 100 adds a new record to the search engine attribute file 116. Subsequently, the meta-search server 100 stores a URL of a site judged as being the search engine 301 in Step S115 to be described later as the URL 1161 of the new record.

Then, the meta-search server 100 acquires an HTML document by accessing the stored URL. After that, the meta-search server 100 extracts a character string from the TITLE tag of the acquired HTML document. Then, the meta-search server 100 stores the extracted character string as the title 1162 of the new record.

Subsequently, the meta-search server 100 stores a difference ratio calculated in Step S115 to be described later as the termhood 1163 of the new record. Next, the meta-search server 100 stores the total number calculated in Step S114 to be described later as the access frequency 1164 of the new record.

As described above, the meta-search server 100 updates the search engine attribute file 116.

Then, the meta-search server 100 ends the information update processing.

FIG. 7 is a flowchart of the query term list creation processing executed by the meta-search server 100 according to the embodiment of this invention.

It should be noted that the query term list creation processing is executed in Step S11 of the information update processing.

First, the meta-search server 100 classifies the access destination URLs 1142 of the access log 114 for each site of the access destination (S111).

For example, the processing is carried out by a method as described below. The meta-search server 100 extracts a character string from the head of the URL to immediately before the symbol "?" from the access destination URL 1142 of the access log 114. Next, the meta-search server 100 removes the head part "http://" from the extracted character string. Then, the meta-search server 100 removes the character string from the symbol ":" to immediately before the symbol "/" from the removed character string. Accordingly, the meta-search server 100 acquires from the extracted character string a character string corresponding to the "host"+"path" of the URL.

Then, the meta-search server 100 classifies the access destination URLs 1142 of the access log 114 for each site of the access destination based on the character string corresponding to the "host"+"path" of the URL. In other words, when the character string corresponding to the "host"+"path" of the URL is the same as the removed character string, the meta-search server 100 judges the log as being an access log for the same site.

Next, the meta-search server 100 judges whether processing from Steps S113 to S116 has been executed with respect to all the classified access destination URLs 1142 (S112). When processing is executed on all the access destination URLs 1142, the meta-search server 100 ends the query term list creation processing.

On the other hand, when any of the access destination URLs 1142 is not processed, the meta-search server 100 selects one of the sites of the access destination which has not been selected in the previous Step S113. Then, the meta-search server 100 extracts all the pairs of the name and value from all the URLs 1142 classified as the selected site (S113).

Next, the meta-search server 100 extracts the name and value from all the extracted pairs according to a construction of the CGI format. Specifically, the meta-search server 100 specifies a break between the pairs by the symbol "&". Further, the meta-search server 100 specifies a break between the name and the value by the symbol "=". Accordingly, the meta-search server 100 can extract the name and value from all the extracted pairs.

It should be noted that even when the format is that other than the CGI format, the meta-search server 100 can extract the name and value according to a construction thereof. This is because a construction resides in other formats than the CGI format as well.

Next, the meta-search server 100 classifies the extracted values for each of the extracted names. Then, the meta-search server 100 calculates the total number and the number of kinds of the classified values (S114). The total number is the number of values classified for each name by the meta-search server 100. The number of kinds is the number of different values that do not overlap one another among the values classified for each name by the meta-search server 100.

Next, the meta-search server 100 judges whether the access destination site selected in Step S113 is the search engine 301 based on the calculated total number and number of kinds (S115).

Specifically, the meta-search server 100 divides the calculated number of kinds by the calculated total number to obtain a difference ratio. Then, the meta-search server 100 compares the obtained difference ratio with a preset threshold. When the obtained difference ratio is equal to or larger than the threshold, the meta-search server 100 judges that the access destination site selected in Step S113 is the search engine 301. This is because, since various terms are transmitted to the search engine 301 as the search query, the difference ratio increases. At this time, the meta-search server 100 specifies the names to be used for specifying the search query from the names extracted in Step S113.

Next, the meta-search server 100 extracts all the values that are in pair with the names to be used for specifying the search query from the values extracted in Step S113. Then, the meta-search server 100 decodes the extracted values to acquire the terms input as the search query. It should be noted that when the term input as the search query is in Japanese, the argument part of the CGI has been encoded based on a hexadecimal system. Subsequently, the meta-search server 100 stores all the acquired terms in the query term list (S116).

Next, the meta-search server 100 returns to Step S112. Then, the meta-search server 100 repeats the query term list creation processing until all the access destination URLs 1142 of the access log 114 are processed.

On the other hand, when the obtained difference ratio is smaller than the threshold, the meta-search server 100 judges that the access destination site selected in Step S113 is not the search engine 301. Thus, the meta-search server 100 does not need to create the query term list. Therefore, the meta-search server 100 directly returns to Step S112. Then, the meta-search server 100 repeats the query term list creation processing until all the access destination URLs 1142 of the access log 114 are processed.

As described above, the meta-search server 100 specifies only the access to the search engine 301 from the access logs. Next, the meta-search server 100 extracts the term transmitted to the search engine 301 as the search query from the specified access. Then, the meta-search server 100 stores the extracted term in the list to create the query term list.

It should be noted that the meta-search server 100 has judged whether the access destination site is the search engine 301 based on the total number and the number of kinds in Step S115. However, the meta-search server 100 may judge whether the access destination site is the search engine 301 by other methods.

For example, when the client computer 201 is operated by a user using Japanese, there is a high possibility that the search query is a Japanese term. Thus, the meta-search server 100 specifies a name that is often in pair with a value corresponding to a Japanese character string as the name to be used for specifying the search query. Further, the meta-search server 100 judges a frequently accessed site, a URL of which includes the value corresponding to the Japanese character string, as being the search engine 301.

In addition, the meta-search server 100 may judge whether the access destination site is the search engine 301 based on information included in the HTML document. Specifically, the meta-search server 100 acquires an HTML document by accessing a URL of the access destination site. Subsequently, the meta-search server 100 judges whether information unique to the search engine 301 is included in the acquired HTML document. The information unique to the search engine 301 includes a text area for input of the search query and a transmission button for transmitting the search query.

When the information unique to the search engine 301 is included in the HTML document, the meta-search server 100 judges the access destination site as being the search engine 301.

Figure 8:
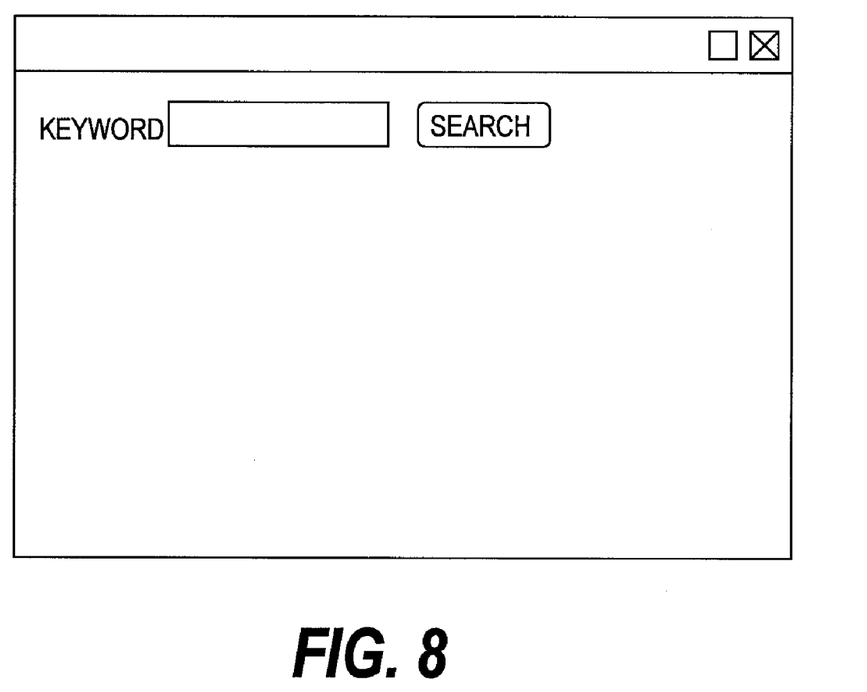
FIG. 8 is an explanatory diagram of a search site screen displayed on a client computer according to the embodiment of this invention.

FIG. 8 is an explanatory diagram of a search site screen displayed on the client computer 201 according to the embodiment of this invention.

The search site screen displays an HTML document transmitted from the search engine 301 using a web browser equipped in the client computer 201.

The search site screen includes a text area for input of the search query and a search button for requesting transmission of the search query.

Figure 9:
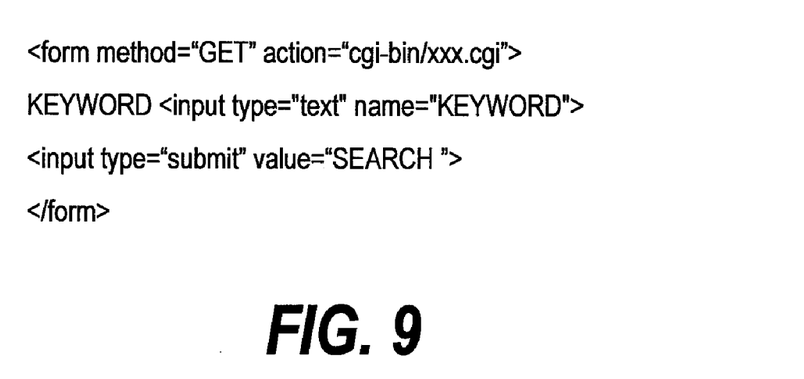
FIG. 9 is an explanatory diagram of a HTML document transmitted from the search engine according to the embodiment of this invention.

FIG. 9 is an explanatory diagram of the HTML document transmitted from the search engine 301 according to the embodiment of this invention.

The HTML document of this explanatory diagram is transmitted for displaying the search site screen shown in FIG. 8.

The HTML document for displaying the search site screen includes a "FORM" tag and an "input" tag. The "FORM" tag is a tag for creating an input form. The "input" tag is used as a part of the form. It should be noted that a "TEXTAREA" tag or the like may be used instead of the "input" tag.

The HTML document for displaying the search site screen includes character strings related to the search, such as a "keyword", "retrieve", and "search". Those character strings are displayed so that the user recognizes the search site.

In other words, the meta-search server 100 can judge whether the access destination site is the search engine 301 based on whether the HTML document includes the "FORM" tag, the "input" tag, the character strings related to the search, and the like.

Figure 10:
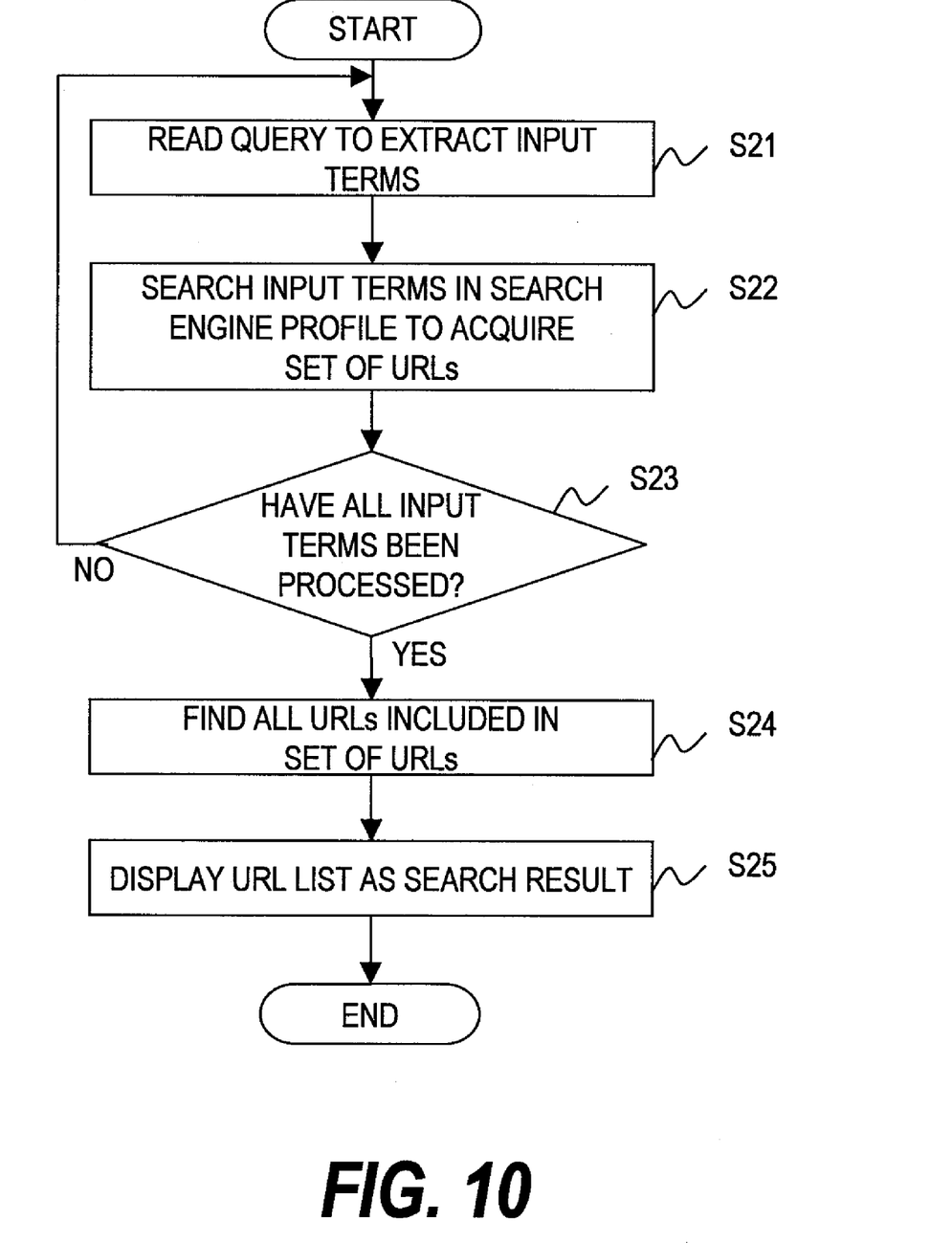
FIG. 10 is a flowchart of meta-search processing executed by the meta-search server according to the embodiment of this invention.

FIG. 10 is a flowchart of search engine search processing executed by the meta-search server 100 according to the embodiment of this invention.

Here, descriptions will be made of a case where the search engine 301 is retrieved through the AND search. However, this invention can be applied to any technique for retrieving a document, such as a search using a Boolean expression, which includes an OR search, and a similarity search using a vector model. Those search techniques are disclosed in "Information Retrieval Algorithm" by Kenji Kita, Kazuhiko Tsuda, and Masami Shishibori, KYORITSU SHUPPAN CO., LTD.

The client computer 201 transmits a search request of the search engine to the meta-search server 100. It should be noted that the search request of the search engine includes one or more terms to be the search query.

The meta-search server 100 receives the search request of the search engine from the client computer 201. Next, the meta-search server 100 extracts a term to be the search query one at a time from the received search request (S21).

Then, the meta-search server 100 selects from the search engine profile 115 all the records whose characteristic word contained in the characteristic word list 1153 of the search engine profile 115 matches the extracted term. Next, the meta-search server 100 extracts the URL 1151 from the selected record (S22).

Subsequently, the meta-search server 100 judges whether all the terms contained in the received search request have been extracted in Step S21 (S23). When not all the terms contained in the search request have been extracted, the meta-search server 100 returns to Step S21 and repeats the processing with respect to the term not yet extracted.

On the other hand, when all the terms contained in the search request have been extracted, the meta-search server 100 specifies the extracted URL 1151 even in the processing for any of the terms extracted in Step S21 (S24).

Next, the meta-search server 100 transmits to the client computer 201 the specified URL 1151 as a result for the search engine search request (S25). For example, the meta-search server 100 creates a search result screen including the search result. Then, the meta-search server 100 transmits the created search result screen to the client computer 201.

The client computer 201 receives the search result screen from the meta-search server 100. Next, the client computer 201 displays the received search result screen. The user can select an appropriate search engine 301 by referring to the displayed search result screen.

Figure 11:
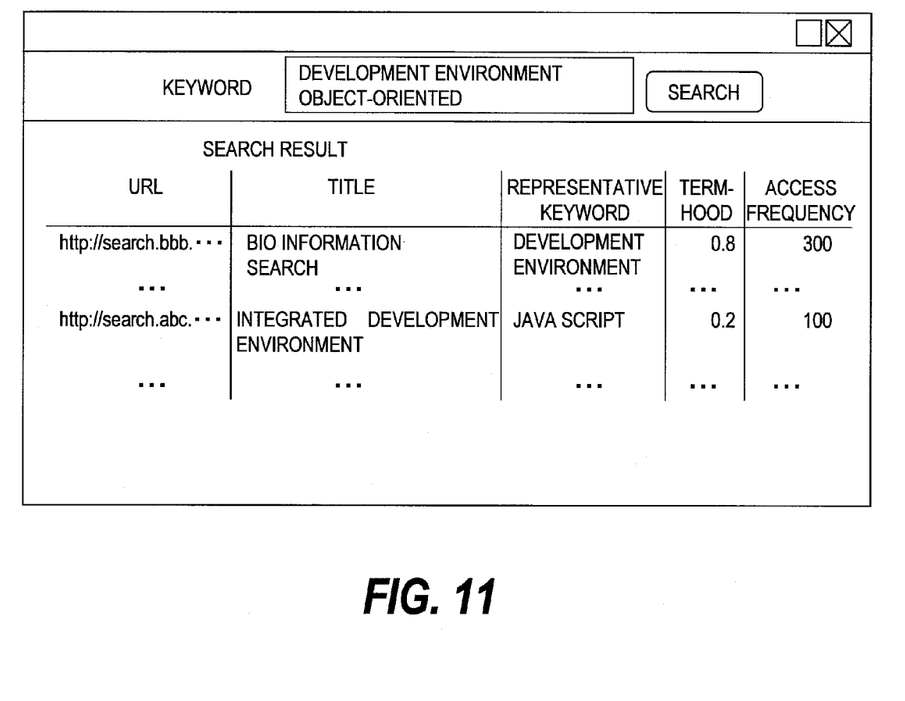
FIG. 11 is an explanatory diagram of a search result screen displayed on the client computer according to the embodiment of this invention.

FIG. 11 is an explanatory diagram of the search result screen displayed on the client computer 201 according to the embodiment of this invention.

A URL, a title, a representative keyword, a termhood, and an access frequency are displayed on the search result screen as the search result.

The URL is an address of the search engine 301 that satisfies a condition requested by the client computer 201.

The title is a name that indicates characteristics of the search engine 301 corresponding to the URL of the record. The representative keyword is a representative term transmitted to the search engine 301 corresponding to the URL of the record.

The termhood indicates a degree of technicality of a document that can be searched for by the search engine 301 corresponding to the URL of the record. The access frequency is the number of times the search engine 301 corresponding to the URL of the record has been accessed.

By providing the title, the termhood, and the access frequency in the search result screen, the user can select an appropriate search engine. In addition, by providing the representative keyword in the search result screen, the user can judge whether the search engine matches the request.

Next, a description will be given of search result screen creation processing executed by the meta-search server 100.

First, the meta-search server 100 stores the URL specified in Step S24 in the search engine search processing of FIG. 10, as the URL of the search result screen. Next, the meta-search server 100 selects a record whose URL 1161 of the search engine attribute file 116 matches the URL specified in Step S24 in the search engine search processing of FIG. 10.

Then, the meta-search server 100 extracts the title 1162, the termhood 1163, and the access frequency 1164 from the selected record. After that, the meta-search server 100 stores the extracted title 1162 as the title of the search result screen. Subsequently, the meta-search server 100 stores the extracted termhood 1163 as the technicality of the search result screen. Then, the meta-search server 100 stores the extracted access frequency 1164 as the access frequency of the search result screen.

Next, the meta-search server 100 selects from the search engine profile 115 a record whose URL 1151 of the search engine profile 115 matches the URL specified in Step S24 in the search engine search processing of FIG. 10. Then, the meta-search server 100 extracts a characteristic word that has frequently been searched for from the characteristic word list 1153 of the selected record. After that, the meta-search server 100 stores the extracted characteristic word as the representative keyword of the search result screen.

As described above, the meta-search server 100 creates the search result screen.

While the present invention has been described in detail and pictorially in the accompanying drawings, the present invention is not limited to such detail but covers various obvious modifications and equivalent arrangements, which fall within the purview of the appended claims.

What is claimed is:

1. A computer system, comprising:
   at least one client computer including a processor, a memory, and an interface;
   a plurality of search engines coupled to the client computer via a network; and
   a management computer coupled to the client computer and the plurality of search engines, wherein the management computer is configured to:
   collect logs of access from the client computer;
   specify a parameter transferred from the client computer to an access destination of the client computer by analyzing the collected logs of access;
   judge whether the specified parameter is a search query;
   judge that an access including the parameter judged as the search query is an access to a given search engine of the plurality of search engines;
   select a log of access to each of the plurality of search engines from the collected logs of access;
   extract an address of the search engine and a search query from the selected log of access to the search engine; and
   store, for each of the plurality of search engines, a correspondence between the extracted address of the search engine and the extracted search query in a search engine profile,
   wherein the management computer is further configured to:
   receive a search request of a search engine containing a search query from the client computer;
   specify an address of the search engine corresponding to the search query contained in the received search request by referring to the search engine profile; and
   transmit the specified address of the search engine to the client computer as a search result.

2. The computer system according to claim 1, wherein the management computer is further configured to judge whether the specified parameter is a search query based on a number of kinds, which is a number of values that do not overlap one another among values contained in the specified parameter.

3. The computer system according to claim 1, wherein the management computer is further configured to:
   select a log of access including the specified parameter from the collected logs of access;
   acquire a document from an access destination corresponding to the selected log of access including the parameter; and
   judge whether the specified parameter is a search query based on whether predetermined information is contained in the acquired document.

4. The computer system according to claim 1, wherein the management computer is further configured to:
   obtain an attribute indicating characteristics of usage of the search engine based on the selected log of access to the search engine;
   store a correspondence between the extracted address of the search engine and the obtained attribute of the search engine in a search engine attribute file;
   specify the attribute of the search engine corresponding to the specified address of the search engine by referring to the search engine attribute file; and
   transmit the specified address of the search engine and the specified attribute of the search engine to the client computer as the search result.

5. The computer system according to claim 4, wherein the attribute of the search engine includes a termhood which indicates a degree of technicality of a document that can be searched for by the search engine.

6. A non-transitory computer readable storage medium having computer executable instructions which are executed by a management computer coupled to at least one client computer and a plurality of search engines coupled to the client computer via a network, and which control the management computer to execute the steps of:
- collecting logs of access from the client computer;
- specifying a parameter transferred from the client computer to an access destination of the client computer by analyzing the collected logs of access;
- judging whether the specified parameter is a search query;
- judging that an access including the parameter judged as the search query is an access to a given search engine of the plurality of search engines;
- selecting a log of access to each of the plurality of search engines from the collected logs of access;
- extracting an address of the search engine and a search query from the selected log of access to the search engine; and
- storing, for each of the plurality of search engines, a correspondence between the extracted address of the search engine and the extracted search query in a search engine profile,
- wherein the program medium further controls the management computer to execute the steps of:
- receiving a search request of a search engine containing a search query from the client computer;
- specifying an address of the search engine corresponding to the search query contained in the received search request by referring to the search engine profile; and
- transmitting the specified address of the search engine to the client computer as a search result.

7. The non-transitory computer readable storage medium according to claim 6, wherein the step of judging whether the specified parameter is a search query includes judging based on a number of kinds, which is a number of values that do not overlap one another among values contained in the specified parameter.

8. The non-transitory computer readable storage medium according to claim 6, wherein:
- the medium further controls the management computer to execute the steps of:
- selecting a log of access including the specified parameter from the collected logs of access; and
- acquiring a document from an access destination corresponding to the selected log of access including the parameter; and
- the step of judging whether the specified parameter is a search query includes judging based on whether predetermined information is contained in the acquired document.

9. The non-transitory computer readable storage medium according to claim 6, wherein: the medium further controls the management computer to execute the steps of:
- obtaining an attribute indicating characteristics of usage of the search engine based on the selected log of access to the search engine;
- storing a correspondence between the extracted address of the search engine and the obtained attribute of the search engine in a search engine attribute file; and
- specifying the attribute of the search engine corresponding to the specified address of the search engine by referring to the search engine attribute file; and
- the step of transmitting the specified address of the search engine to the client computer as a search result includes transmitting the specified attribute of the search engine together with the specified address of the search engine.

10. The non-transitory computer readable storage medium according to claim 9, wherein the attribute of the search engine includes a termhood which indicates a degree of technicality of a document that can be searched for by the search engine.

11. A search engine search method in a computer system including at least one client computer including a processor, a memory, and an interface, a plurality of search engines coupled to the client computer via a network, and a management computer coupled to the client computer and the search engines, the method comprising the steps of:
- collecting logs of access from the client computer;
- specifying a parameter transferred from the client computer to an access destination of the client computer by analyzing the collected logs of access;
- judging whether the specified parameter is a search query;
- judging that an access including the parameter judged as the search query is an access to a given search engine of the plurality of search engines;
- selecting a log of access to each of the plurality of search engines from the collected logs of access;
- extracting an address of the search engine and a search query from the selected log of access to the search engine; and
- storing, for each of the plurality of search engines, a correspondence between the extracted address of the search engine and the extracted search query in a search engine profile,
- further comprising the steps of:
- receiving a search request of a search engine containing a search query from the client computer;
- specifying an address of the search engine corresponding to the search query contained in the received search request by referring to the search engine profile; and
- transmitting the specified address of the search engine to the client computer as a search result.

12. The search engine search method according to claim 11, wherein the step of judging whether the specified parameter is a search query includes judging based on a number of kinds, which is a number of values that do not overlap one another among values contained in the specified parameter.

13. The search engine search method according to claim 11, further comprising the steps of:
- selecting a log of access including the specified parameter from the collected logs of access; and
- acquiring a document from an access destination corresponding to the selected log of access including the parameter,
- wherein the step of judging whether the specified parameter is a search query includes judging based on whether predetermined information is contained in the acquired document.

14. The search engine search method according to claim 11, further comprising the steps of:
- obtaining an attribute indicating characteristics of usage of the search engine based on the selected log of access to the search engine;
- storing a correspondence between the extracted address of the search engine and the obtained attribute of the search engine in a search engine attribute file; and
- specifying the attribute of the search engine corresponding to the specified address of the search engine by referring to the search engine attribute file,
- wherein the step of transmitting the specified address of the search engine to the client computer as a search result includes transmitting the specified attribute of the search engine together with the specified address of the search engine.

15. The search engine search method according to claim 14, wherein the attribute of the search engine includes a termhood which indicates a degree of technicality of a document that can be searched for by the search engine.

* * * * *